(No Model.)
G. M. BOWEN.
BACK STRAP FOR PLOW HARNESS.
No. 259,801. Patented June 20, 1882.
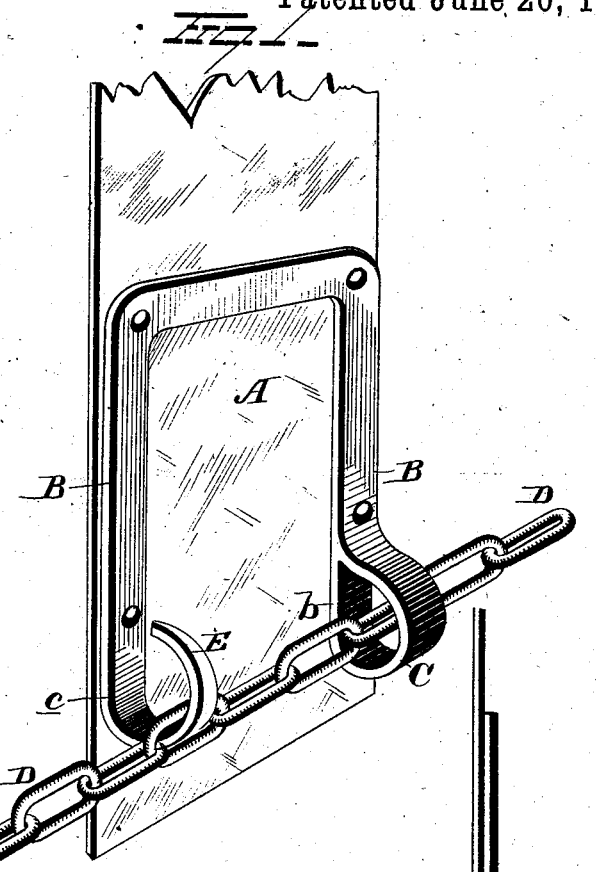
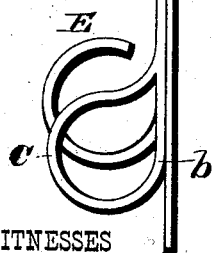
WITNESSES
INVENTOR
Geo. M. Bowen.
ATTORNEY

UNITED STATES PATENT OFFICE.

GEORGE M. BOWEN, OF TALBOTT, TENNESSEE.

BACK-STRAP FOR PLOW-HARNESS.

SPECIFICATION forming part of Letters Patent No. 259,801, dated June 20, 1882.

Application filed December 13, 1881. (No model.)

*To all whom it may concern:*

Be it known that I, GEORGE M. BOWEN, of Talbott, in the county of Jefferson and State of Tennessee, have invented certain new and useful Improvements in Back-Straps for Plow-Harness; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in back-straps for plow-harness, the object of the same being to provide an improved back-strap that will be of small initial cost, durable in use, and adapted by its peculiar construction to be adjusted to any portion of the animal's back, and be retained in position thereon simply by its connection with the trace-chains.

With these ends in view my invention consists in certain details in construction and combinations of parts, as will be more fully explained, and pointed out in the claims.

In the accompanying drawings, Figure 1 is a perspective view, showing the manner of securing my back-strap to the trace-chains, and Fig. 2 represents side views of one end of the back-strap.

A represents the back-strap, made of canvas, leather, or any suitable material, to the opposite ends of which are riveted in the ordinary manner the metallic attaching devices B. These attaching devices B are rectangular in shape, and are each provided at their lower ends $b$ with an eye, C, cast integral therewith, and of sufficient size for the free passage of the trace-chains D, while each opposite lower end $c$ is provided with a hook, E, the latter also being cast integral with the rectangular frame B.

To secure the back-strap in position, it is simply necessary to pass the hame ends of the trace-chains through the eyes C, after which the chains can be secured to the hame. After the chains have been passed through the eyes C the back-strap, with its attaching devices, is free to be moved over the entire length of the horse's back until the proper position thereon has been reached, when the hooks E are passed through the adjacent links on opposite sides of the horse, which secures the back-strap and prevents its further movement until the links have been taken off the hooks.

When my improved device is used the traces are held up from under the horse's feet, and are always in a position for starting, which obviates the necessity and danger of disengaging the traces from the horse, where they are allowed to rest on the ground every time the horse is stopped.

I prefer to make the attaching devices B of malleable cast-iron; but any suitable material can be used instead thereof. So also can the eye C and the hook E be formed separate from the rectangular frame and secured thereto in any suitable manner; and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. A back-strap attachment for plow-harness, consisting of a piece of metal adapted to be attached to the back-strap and provided with an eye at one end and with a hook at the other end.

2. The combination, with the back-strap A, made of any suitable material, of the metallic attaching devices B, each consisting of a rectangular frame, by which the device is secured to the back-strap, an eye or loop, C, for the passage of the chain, and a hook, E, adapted to engage the trace and hold the said back-strap in position.

In testimony that I claim the foregoing I have hereunto set my hand this 5th day of December, 1881.

GEORGE M. BOWEN.

Witnesses:
C. D. REESE,
W. W. SUNDERLAND.